United States Patent [19]

Bateika

[11] 4,417,187
[45] Nov. 22, 1983

[54] CIRCUIT FOR CONTROLLING THE SPEED OF A MOTOR

[75] Inventor: Gediminas Bateika, Karlsruhe, Fed. Rep. of Germany

[73] Assignee: Pfaff Haushaltmaschinen GmbH, Fed. Rep. of Germany

[21] Appl. No.: 324,074

[22] Filed: Nov. 23, 1981

[30] Foreign Application Priority Data

Dec. 24, 1980 [DE] Fed. Rep. of Germany ....... 3049022

[51] Int. Cl.³ .............................................. H02P 5/12
[52] U.S. Cl. .................................................... 318/331
[58] Field of Search ........ 318/331, 314, 318, 345 CA, 318/345 AB, 266

[56] References Cited

U.S. PATENT DOCUMENTS

| | | | |
|---|---|---|---|
| 3,191,112 | 6/1965 | Cain | 318/331 |
| 3,470,439 | 9/1969 | Brown | 318/331 |
| 3,621,295 | 11/1971 | Callan | 318/345 X |
| 4,274,037 | 6/1981 | Soeda | 318/266 X |
| 4,334,177 | 6/1982 | Lund | 318/345 G |

FOREIGN PATENT DOCUMENTS

| | | | |
|---|---|---|---|
| 42-39737 | 5/1967 | Japan | 318/331 |
| 55-13634 | 1/1980 | Japan | 318/345 G |

Primary Examiner—J. V. Truhe
Assistant Examiner—Shik Luen Ip
Attorney, Agent, or Firm—McGlew and Tuttle

[57] ABSTRACT

A circuit is disclosed for controlling the speed of a motor having a constant magnetic field and supplied from an alternating current line source through a controllable semiconductor rectifier which utilizes a pair of series connected electronic switches each followed by storage capacitors. The switches are operated in phase opposition by the line frequency and followed by the input of a controller whose output is connected to a firing stage for firing the semiconductor rectifier.

4 Claims, 6 Drawing Figures

CIRCUIT FOR CONTROLLING THE SPEED OF A MOTOR

FIELD AND BACKGROUND OF THE INVENTION

The present invention relates in general to motor control and in particular to a new and useful circuit for controlling the speed of a motor utilizing two series connected electronic switches which are controlled in phase opposition by power line frequency through storage units such as capacitors.

Motors having a constant magnetic field are usually equipped with a tacho-generator, for determining the actual speed. This generator produces a frequency which is proportional to the motor speed and is then compared with the preset desired speed of the motor, in order to adjust the speed through a controller stage. The costs of such a tacho-generator, particularly for fractional hp motors, are in no economically reasonable proportion to the costs of the motor.

A switching arrangement is known for controlling the speed of motors (German AS No. 26 08 613) in which the armature emf is periodically measured and used for controlling the duration of the next cut-in period.

In this arrangement, the emf which is proportional to the motor speed is isolated in a very complicated and expensive way, so that the manufacture is as costly as the abovementioned arrangements with a tacho-generator.

SUMMARY OF THE INVENTION

The present invention is directed to a design which permits a determination of the motor emf which corresponds to the motor speed. In the prior art, this can be ascertained only with a very costly control circuitry. The invention uses a simpler and less expensive way, so that a determination of the actual motor speed can be applied even to the control of low-priced motors.

In the inventive circuit, the period during which the motor emf is proportional to the motor speed is isolated by means of two switches in phase opposition by which the undesirable portions of the voltage variation are filtered out and which are followed by storages where the actual voltage is maintained during the entire duration of the cycle.

Accordingly, an object of the present invention is to provide a circuit for controlling a speed of a motor having a constant magnetic field and supplied from an alternating current source through a controllable semiconductor rectifier, in which a generator-action voltage corresponding to the speed of the motor controls the operating time of the semiconductor rectifier, wherein the generator-action voltage is applied through two series connected switches which are controlled in phase opposition by the line frequency, and through storage units following each of the switches, to the input of a controller having its output connected to a firing stage of the semiconductor rectifier.

A further object of the invention is to provide such a circuit when switches are COS/MOS analog switches having their control circuits connected in the control-emitter path of switching transistors having bases controllable by the line frequency.

A still further object of the invention is to provide such a circuit wherein the storage units following each of the switches comprise a capacitor followed by an impedance transformer.

Another object of the invention is to provide such a circuit which is simple in design and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which a preferred embodiment of the invention is illustrated.

BRIEF DESCRIPTION OF THE DRAWINGS

One embodiment of the invention is explained in the following with reference to the drawings in which.

DESCRIPTION OF THE PREFERRED EMBODIMENT

Figure 1:
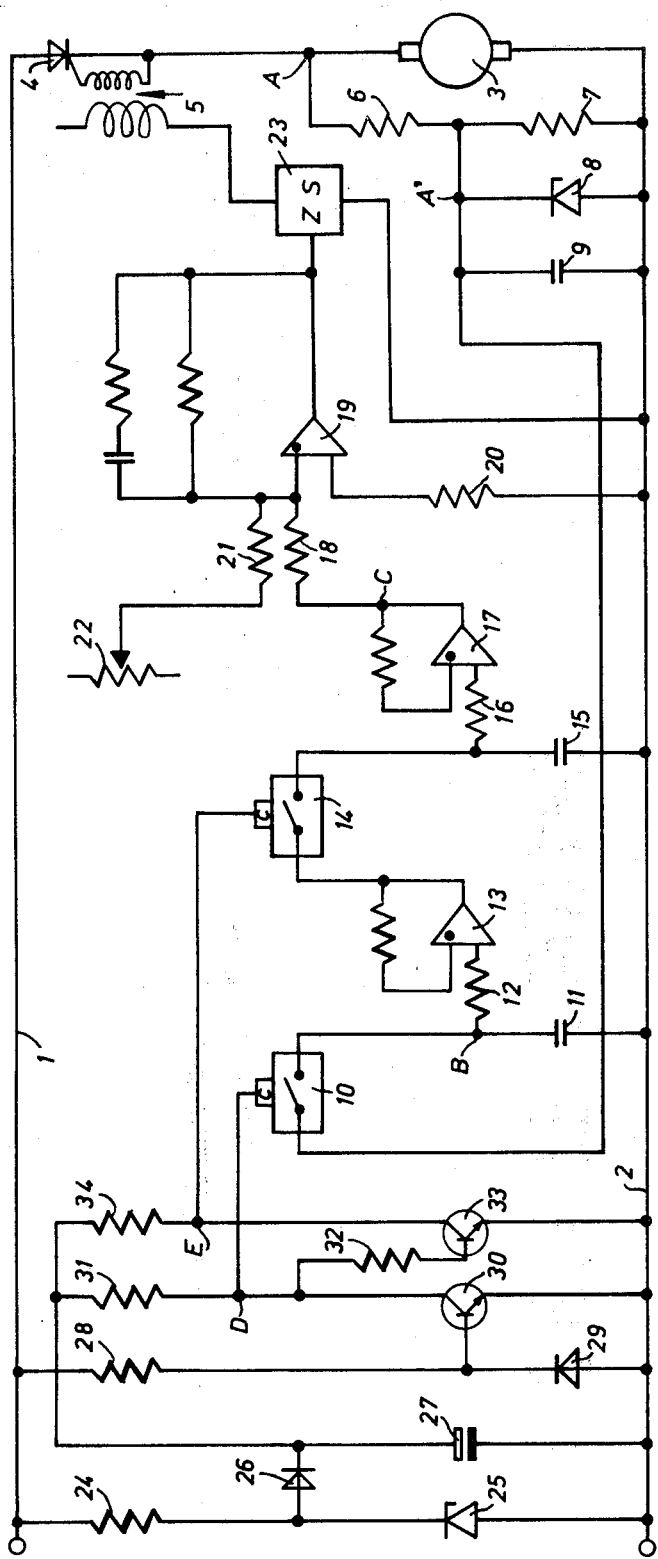
FIG. 1 is a circuit for controlling the speed of a motor.

Referring to the drawings in particular the invention embodied therein, comprises a motor 3 and a semiconductor controlled rectifier or thyristor 4 connected to lines 1 and 2 respectively, to which the power line voltage is applied over A.C. power terminals 50 and 51. Thyristor 4 is turned on through a firing transformer 5 at the start of every half wave of the line current and interrupts the current flowing through motor 3 at the zero passage of the line voltage.

Series connected resistors 6,7 are provided in parallel with motor 3, as a voltage divider, to reduce the picked-up voltage to a value suitable for the following elements. Parallel to resistor 7, a Zener or break-down diode 8 and a capacitor 9 are provided. The reduced armature voltage picked up by voltage divider 6,7 is applied through a first COS/MOS analog switch 10, to a capacitor 11 which is connected to line 2, and through a high-impedance resistor 12 to one input of an operational amplifier 13 connected as an impedance transformer. The output of the operational amplifier 13 is again applied through a second COS/MOS analog switch 14 to a capacitor 15 connected to line 2, and through a high-impedance resistor 16 to one input of a second operational amplifier 17 connected as an impedance transformer.

The output voltage of the second operational amplifier 17 is applied through a resistor 18 to the inverting input of an operational amplifier 19 which is connected as a controller. The non-inverting input of operational amplifier 19 is connected through a resistor 20 to line 2. The inverting input of operational amplifier 19 is further connected through a resistor 21 to a potentiometer 22 where the voltage corresponding to the desired speed value can be tapped off. The output of operational amplifier 19 is applied to a firing stage or switch 23 to which a firing transformer 5 is connected.

A resistor 24 and a Zener diode 25 are series connected between the two lines 1 and 2. A diode 26 is connected between Zener diode 25 and resistor 24 to the junction. A stabilized D.C. voltage can be picked up at a capacitor 27 which is provided between diode 26 and line 2.

Another resistor 28 and a diode 29 are series connected between lines 1 and 2, and to their junction, the base of an npn-transistor 30 is applied having its emitter connected to line 2 and its collector applied through a resistor 31 to the stabilized D.C. voltage at capacitor 27.

The base of a second transistor 33 is connected through a resistor 32 to the collector of the first transistor 30, while its emitter is applied to line 2 and its collector is connected through a resistor 34 to capacitor 27.

The collector of transistor 30 is, in addition, connected to the control electrode of analog switch 10, and the collector of transistor 33 is connected to the control electrode of analog switch 14.

With motor 3 in operation, firing stage 23 turns thyristor 4 ON, in a way described hereinafter, through firing transformer 5, and during the positive half wave of the alternating voltage. Thus, up to the zero passage of the line voltage, the current flows through motor 3. At the start of the negative half wave, thyristor 4 turns OFF, so that during the negative half wave, no current can flow through motor 3.

Figure 2A:
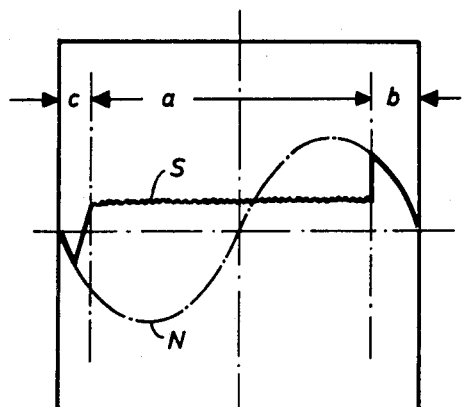
FIGS. 2a, 2b and 2c are wave-form diagrams for points A,B and C respectively of the circuit in FIG. 1.

Under these conditions, the voltage S at the armature of motor 3 (point A) varies in a way having three sections or periods, one following the other. These sections are shown in FIG. 2a along with the line voltage N, it being understood that in fact, what is shown is the voltage variation at point A, which, due to the voltage divider comprising resistors 6 and 7, is directly proportional to that at point A.

In section a, (FIG. 2a) the voltage is shown which is produced by the armature of motor 3 during the turn-off period of thyristor 4. This voltage is proportional to the speed of motor 3. As soon as thyristor 4 turns ON, voltage S corresponds to the line voltage N (section b). In section c, immediately after the zero passage of line voltage N, voltage S drops in the shown way, due to the inverse voltage caused by the inductance of the armature.

Only the voltage of section a, proportional to the speed and produced during the turn-off period of thyristor 4, can be permitted to pass to operational amplifier 19 as the actual voltage. Therefore, the voltage portions corresponding to sections b and c are filtered out in the two analog switches 10, 14.

Analog switches 10 and 14 are switched On and OFF by the line voltage. During the positive half wave of the line voltage, a constant voltage is established across Zener diode 25, which is applied through diode 26 to capacitor 27 and is available as a stabilized voltage.

Figure 3A:
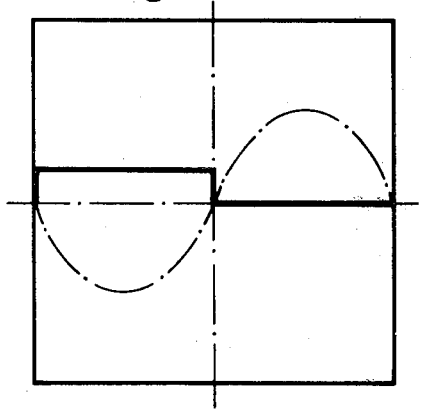
FIGS. 3a and 3b are wave-form diagrams for points D and E respectively of the circuit in FIG. 1.

During the positive half wave, the voltage at the base of transistor 30 is positive and the transistor is conducting. This causes a voltage drop at the electrode of analog switch 10 so that the switch switches OFF (opens) as shown in FIG. 3a. FIG. 3a shows the voltage variation during one line voltage cycle at the point D.

Figure 3B:
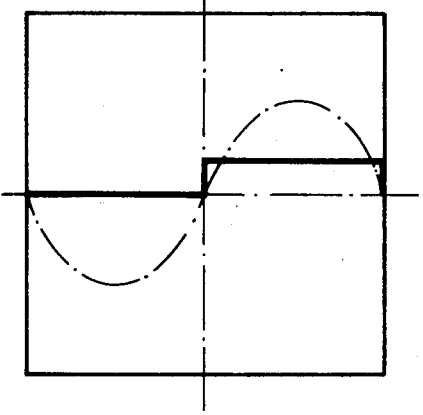

Simultaneously with the voltage at the collector of transistor 30, the voltage at the base of transistor 33 also drops to zero. This enables transistor 33 and, due to the voltage building up at its electrode, analog switch 14 switches ON (closes) as shown in FIG. 3b for point E.

Figure 2B:
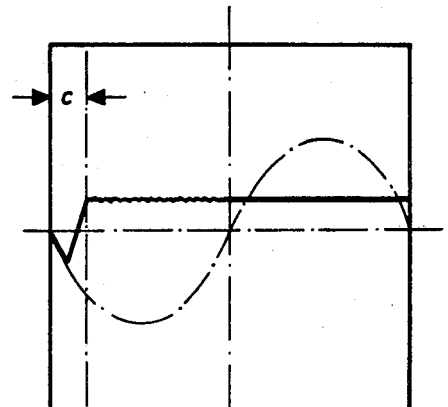

When analog switch 10 switches (OFF) opens, capacitor 11 virtually does not discharge, because of the high-impedance input of operational amplifier 13, so that after the switching OFF, the voltage at point B remains constant. FIG. 2b shows this condition at point B, for one period of the line voltage. The voltage applied to the input of operational amplifier 13 is now free from disturbances caused by the firing of thyristor 4. However, it still contains the drop shown in section c and due to the commutation of thyristor 4. The voltage signal passes through operational amplifier 13 and second analog switch 14 to capacitor 15, and through resistor 16 to the input of operational amplifier 17. The voltage signal disturbance caused by the commutation is filtered out due to the fact that at the start of the negative half wave of the line voltage, transistor 30 is disabled and, since a positive potential builds up at the collector thereof, at point D (FIG. 3a) transistor 33 becomes conducting. At point E, the voltage therefore drops to zero at the same time (FIG. 3b). This switches analog switch 10 ON (closed) and analog switch 14 OFF (open).

Figure 2C:
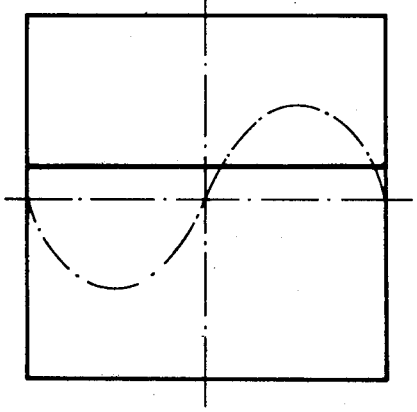

Upon switching analog switch 14 OFF(open), the voltage signal at operational amplifier 17 also remains substantially constant, in accordance with the conditions at operational amplifier 13, so that a voltage, free from any disturbances is obtained at the output (point C) of operational amplifier 17, which is proportional to the actual speed of motor 3. FIG. 2c shows this voltage diagrammatically. This voltage is now supplied through resistor 18 to the inverting input of operational amplifier 19, to which also the voltage proportional to the desired speed value picked up at potentiometer 22 is applied. The output of operational amplifier 19, which is connected as a controller, controls the firing stage 23 by which, in a manner known per se, thyristor 4 is turned ON through firing transformer 5.

While a specific embodiment of the invention has been shown and described in detail to illustrate the application of the principles of the invention, it will be understood that the invention may be embodied otherwise without departing from such principles.

What is claimed is:

1. A circuit for controlling the speed of a motor having a constant magnetic field and supplied from an alternating current source having a line frequency through a controllable semiconductor rectifier, in which a generator action voltage corresponding to the speed of the motor controls the operating time of the semiconductor rectifier, comprising two series connected switches for receiving the generator action voltage which are controlled in phase opposition by the line frequency, a voltage storage unit following each switch, a controller having an input connected to the output of the last storage unit in the series connected switches, the controller having an output, and a firing stage connected to the semiconductor rectifier for turning the semiconductor rectifier ON connected to the output of the controller.

2. A circuit according to claim 1, wherein said switches are each COS/MOS analog switches, each having a control circuit for opening and closing said switches, a transistor having a collector emitter path connected to each control circuit and a base controllable by the line frequency.

3. A circuit according to claim 2, wherein each storage unit comprises a capacitor followed in series by an impedance transformer.

4. A circuit according to claim 1, wherein the semiconductor rectifier is connected in series with the armature of the motor, a first line of the alternating current source is connected to the thyristor and a second line of the alternating current source is connected to the motor armature, each of said switches having one contact connected through each storage unit to said second line, each storage unit comprising a capacitor, a first high impedance transformer connected between the junction between a first of said switches and its capacitor and a second terminal of the second of said switches, a second impedance transformer connected between the terminal of the second of said switches and its associated capacitor and the input of said controller, a variable voltage source connected to the input of said controller, each switch having a control terminal, a transistor for each switch having a collector connected to each respective control terminal and an emittor connected to said second line, a base of the transistor connected to the first of said switches connected to a diode, said diode connected in turn to said second line and a terminal between said diode and said first transistor base connected through a resistor to said first line, the collector of the transistor of the first of said switches also connected to the base of the transistor for the second of said switches, the collector of each of said switches also connected to a reference constant voltage source.

* * * * *